(12) United States Patent
Simpson et al.

(10) Patent No.: US 10,408,492 B2
(45) Date of Patent: Sep. 10, 2019

(54) DRAIN HOLE ORIFICE DEVICE

(71) Applicant: Hamilton Sundstrand Corporation, Windsor Locks, CT (US)

(72) Inventors: Christopher Simpson, West Hartford, CT (US); Brian R. Shea, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 476 days.

(21) Appl. No.: 14/996,424

(22) Filed: Jan. 15, 2016

(65) Prior Publication Data

US 2017/0205111 A1    Jul. 20, 2017

(51) Int. Cl.
| | |
|---|---|
| *B01D 45/00* | (2006.01) |
| *F24F 13/22* | (2006.01) |
| *B01D 45/16* | (2006.01) |
| *B01D 45/12* | (2006.01) |
| *B64D 13/06* | (2006.01) |
| *B64D 13/00* | (2006.01) |
| *B04C 3/06* | (2006.01) |
| *A47L 9/16* | (2006.01) |

(52) U.S. Cl.
CPC ............ *F24F 13/222* (2013.01); *B01D 45/12* (2013.01); *B01D 45/16* (2013.01); *B64D 13/00* (2013.01); *B64D 13/06* (2013.01); *A47L 9/1608* (2013.01); *A47L 9/1683* (2013.01); *B04C 3/06* (2013.01); *B64D 2013/0603* (2013.01); *B64D 2013/0662* (2013.01); *Y02T 50/44* (2013.01)

(58) Field of Classification Search
CPC ....... F24F 13/222; B64D 13/00; B64D 13/06; B64D 2013/0603; B64D 2013/0662; Y02T 50/44; B01D 45/16; B04C 3/06; E21B 17/042; F16L 15/08; F16L 15/06; F16L 19/025; F16L 21/08
See application file for complete search history.

(56) References Cited

U.S. PATENT DOCUMENTS

| | | | | |
|---|---|---|---|---|
| 1,766,621 | A | * 6/1930 | Fleming ................ | E03F 5/0409 138/89 |
| 2,700,987 | A | * 2/1955 | Whalen ..................... | F16T 1/14 137/204 |
| 2,774,444 | A | * 12/1956 | Soddy .................... | B01D 45/16 55/345 |
| 2,816,564 | A | * 12/1957 | Wilkerson .............. | F17C 13/02 137/110 |

(Continued)

FOREIGN PATENT DOCUMENTS

| | | |
|---|---|---|
| DE | 2702148 A1 | 7/1978 |
| GB | 2427682 A | 1/2007 |

OTHER PUBLICATIONS

Extended European Search Report, for European Patent Application No. 17150403.8, dated Apr. 7, 2017, 7 pages.

*Primary Examiner* — Dung H Bui
(74) *Attorney, Agent, or Firm* — Kinney & Lange, P.A.

(57) ABSTRACT

An environmental control system includes two environmental control system components with a duct extending between them. There is a drain in the duct including an orifice through the duct, a plenum in serial fluid communication with the orifice; and an orifice device removably connected to the duct, the orifice device including a second orifice in serial fluid communication with the plenum and the first orifice.

16 Claims, 3 Drawing Sheets

(56) References Cited

U.S. PATENT DOCUMENTS

| | | | |
|---|---|---|---|
| 3,093,466 A * | 6/1963 | Zankey | B01D 53/26 |
| | | | 137/195 |
| 3,339,349 A | 9/1967 | Farnum | |
| 4,122,592 A * | 10/1978 | Ehret | E03C 1/02 |
| | | | 138/90 |
| 4,506,705 A * | 3/1985 | Thompson | F16L 55/132 |
| | | | 138/89 |
| 4,620,330 A * | 11/1986 | Izzi, Sr. | E03C 1/12 |
| | | | 138/89 |
| 4,668,256 A * | 5/1987 | Billiet | B01D 45/08 |
| | | | 55/337 |
| 5,115,554 A * | 5/1992 | Fell, Sr. | E03D 11/16 |
| | | | 138/90 |
| 5,800,582 A | 9/1998 | Palmer et al. | |
| 6,068,023 A * | 5/2000 | Potter | F16K 5/0207 |
| | | | 137/240 |
| 6,116,285 A * | 9/2000 | Wilson | F16L 55/1108 |
| | | | 138/89 |
| 6,331,195 B1 | 12/2001 | Faust et al. | |
| 6,619,054 B1 | 9/2003 | Cargnelli et al. | |
| 6,651,690 B1 * | 11/2003 | Coogle | C02F 1/688 |
| | | | 137/268 |
| 7,191,606 B1 * | 3/2007 | Dwyer | F24F 13/222 |
| | | | 62/150 |
| 7,470,300 B2 | 12/2008 | Faust et al. | |
| 7,543,458 B1 | 6/2009 | Wurth | |
| 7,591,869 B2 | 9/2009 | Jensen et al. | |
| 7,624,759 B1 * | 12/2009 | Ismert | E03C 1/22 |
| | | | 138/89 |
| 7,727,313 B2 * | 6/2010 | Blackwood | B60T 17/002 |
| | | | 55/432 |
| 8,276,619 B2 | 10/2012 | Morton et al. | |
| 8,470,062 B2 * | 6/2013 | Herman | F16L 55/24 |
| | | | 55/420 |
| 2002/0144599 A1 | 10/2002 | Afeiche et al. | |
| 2005/0044825 A1 | 3/2005 | Bazzarella et al. | |
| 2006/0104469 A1 * | 5/2006 | Hawker | H04R 1/083 |
| | | | 381/365 |
| 2006/0275717 A1 * | 12/2006 | Jensen | B64D 13/00 |
| | | | 431/11 |
| 2013/0312432 A1 | 11/2013 | Hodges et al. | |
| 2015/0059868 A1 * | 3/2015 | Oakner | F24F 13/222 |
| | | | 137/240 |
| 2015/0090119 A1 | 4/2015 | Au et al. | |
| 2016/0001637 A1 * | 1/2016 | Kume | F24F 13/222 |
| | | | 62/285 |
| 2016/0377316 A1 * | 12/2016 | Ellsworth | F24F 13/222 |
| | | | 62/285 |
| 2017/0023274 A1 * | 1/2017 | Peticca | F24F 13/222 |
| 2018/0126312 A1 * | 5/2018 | Yamauchi | B01D 45/12 |

* cited by examiner

DRAIN HOLE ORIFICE DEVICE

BACKGROUND

The present invention relates to an Environmental Control System, and, more particularly, to a drain for components within an aircraft air conditioning package.

Air conditioning systems are utilized in aircraft for multiple purposes, for example, providing air to the cabin at the proper pressure and temperature. There can be many different components in an air conditioning system, and some of these components are connected with ducts. Due to the changes in pressure and temperature that the air undergoes as it is being conditioned as well as the ambient temperature outside of the duct, liquid water may condense out of the air in the duct.

In addition to liquid water, there may be other foreign body debris in the air conditioning system ducts. This can be due to the gas turbine engine ingesting items such as dirt or bugs or from wear on the Environmental Control System components during operation. It is beneficial to rid the ducts of both the water and the foreign object debris, although doing so can allow the conditioned air in the duct to escape, reducing system operating efficiency.

SUMMARY

According to one embodiment of the present invention, an environmental control system includes two environmental control system components with a duct extending between them. There is a drain in the duct including an orifice through the duct, a plenum in serial fluid communication with the orifice; and an orifice device removably connected to the duct, the orifice device including a second orifice in serial fluid communication with the plenum and the first orifice.

According to another embodiment of the present invention, a drain arrangement includes a duct, an orifice through the duct, and an extension extending from the exterior of the duct near the orifice. The extension includes a plenum in fluid communication with the orifice, and there is an orifice device removably connected to the extension. The orifice device includes another orifice in serial fluid communication with the plenum and the orifice through the duct.

DETAILED DESCRIPTION

Figure 1:
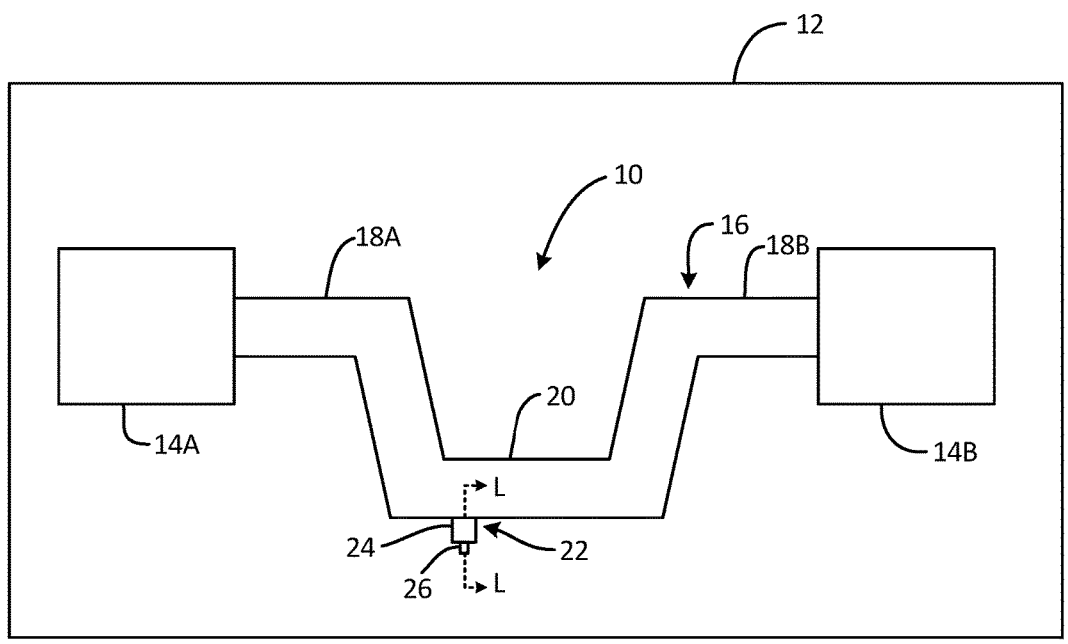
FIG. 1 is a schematic side cross-section view of an air conditioning package for an aircraft.

FIG. 1 is a schematic side cross-section view of air conditioning package 10 for aircraft 12. Air conditioning package 10 is an Environmental Control System (ECS) that is positioned inside of aircraft 12 and includes ECS components 14A and 14B. ECS components 14A and 14B can each be, for example, a heat exchanger, a water collector, a turbine, a compressor, or a valve.

In the illustrated embodiment, air conditioning duct 16 extends between and fluidly connects components 14A and 14B. Duct 16 has two high regions 18A and 18B proximate components 14A and 14B, respectively, with low region 20 in between. Low region 20 is located beneath high regions 18A and 18B, so any material that is not buoyant in the air in duct 16, such as liquid water or foreign object debris, would tend to collect in low region 20.

Drain arrangement 22 extends from the exterior of low region 20. Drain arrangement 22 includes extension 24, which is integral with and extends from duct 16, and drain hole orifice device 26 which is removably connected to extension 24. As will be explained in greater detail below, drain arrangement 22 allows for liquid water and foreign object debris to exit duct 16 while restricting the flow of the conditioned air in duct 16 from also exiting.

Figure 2A:
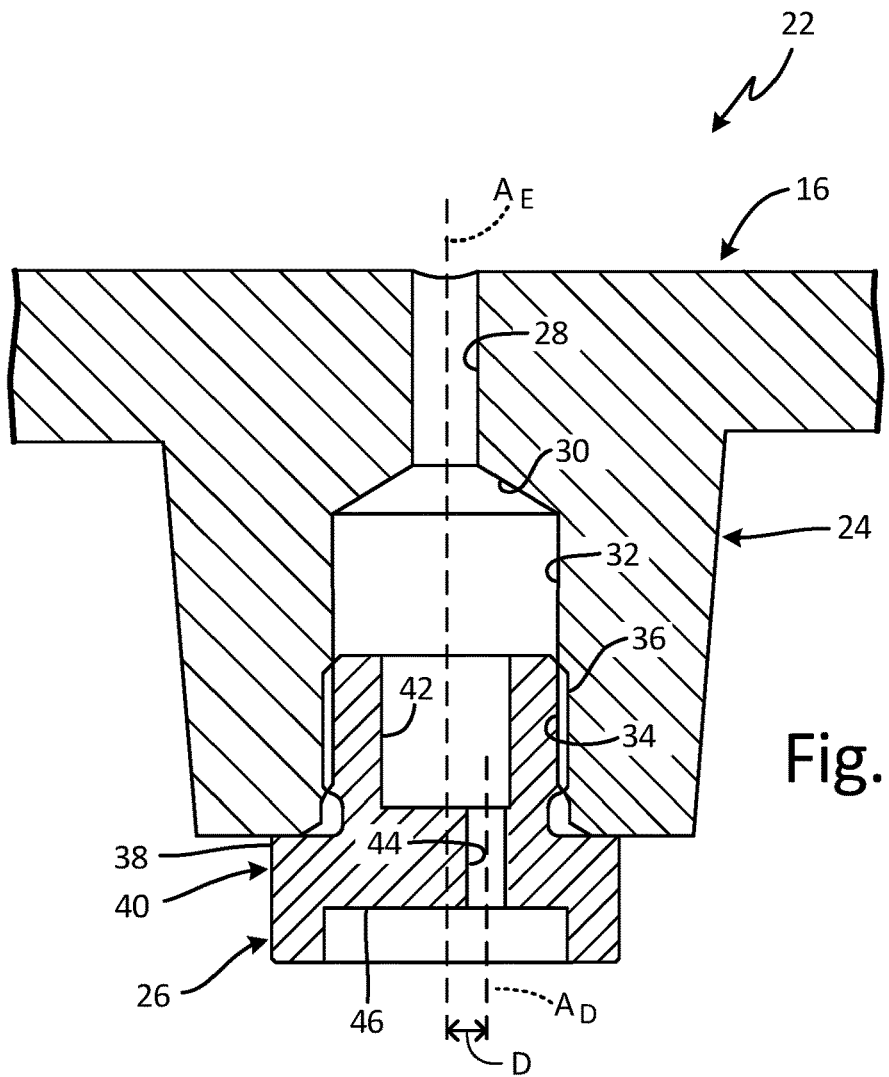
FIG. 2A is a cross-sectional view along line L-L in FIG. 1 of a drain arrangement including an extension of an air conditioning duct and a drain hole orifice device.
Figure 2B:
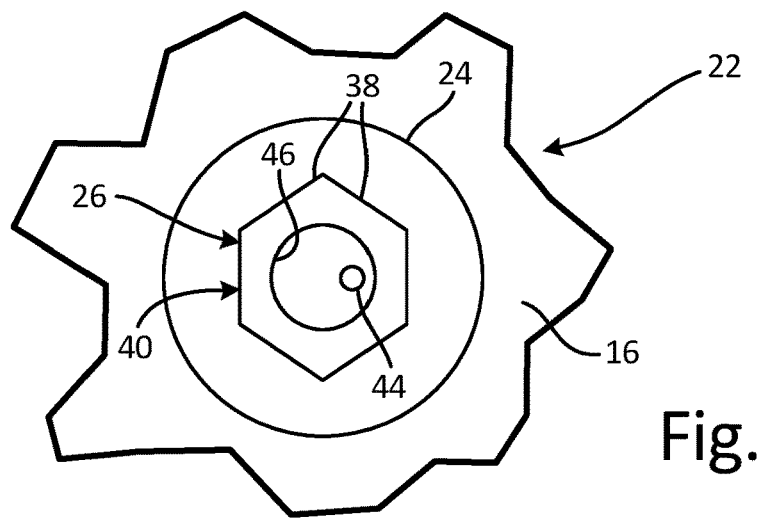
FIG. 2B is a bottom view of the drain arrangement including the extension of the air conditioning duct and the drain hole orifice device.

FIG. 2A is a cross-sectional view along line L-L in FIG. 1 of drain arrangement 22 including extension 24 of duct 16 and drain hole orifice device 26, and FIG. 2B is a bottom view of drain arrangement 22. FIGS. 2A and 2B will now be discussed together.

In the illustrated embodiment, duct 16 includes extension 24 which is a cylindrical boss that protrudes from the exterior of duct 16 along extension axis $A_E$. Duct 16 and extension 24 also include a plurality of cavities that are surrounded by extension 24, including duct orifice 28, transition 30, and extension plenum 32, all of which have circular cross-sections and extend along extension axis $A_E$. Duct orifice 28 is in fluid communication with the interior of duct 16, and transition 30 and extension plenum 32 are in serial fluid communication with duct orifice 28. Outward of extension plenum 32, extension 24 has internal threads 34.

Extension 24 includes internal threads 34 that engage external threads 36 of orifice device 26 to removably connect orifice device 26 to extension 24. Orifice device 26 can be tightened into extension 24 using a tool such as a wrench (not shown) that engages faces 38 on device head 40. In alternative embodiments, orifice device 26 can be removably connected to extension 24 using another structure, such as a bolt pattern, a twist-lock, or a latch. Orifice device 26 also includes a plurality of cavities, including device plenum 42, device orifice 44, and head plenum 46, all of which have circular cross-sections. Device plenum 42 and head plenum 46 extend along extension axis $A_E$ while device orifice 44 extends along device axis $A_D$, which is parallel to but separated by distance D from extension axis $A_E$. When orifice device 26 is installed in extension 24, device plenum 42, device orifice 44, and head plenum 46 are in serial fluid communication with duct orifice 28.

During operation of air conditioning package 10, conditioned air which is at a higher pressure than the air exterior to duct 16 flows from component 14A to component 14B (all shown in FIG. 1). A small portion of this air passes through drain arrangement 22, carrying with it any liquid water or foreign object debris present. Because duct orifice 28 and device orifice 44 have diameters and cross-sectional areas that are substantially smaller than those of plenums 32, 42, and 46, any air escaping through drain arrangement 22 must pass through the two constrictions at orifices 28 and 44. The escaping air utilizes some of its energy to pass through orifices 28 and 44, resulting in a drop in pressure of the escaping air which slows the flow rate of air through drain arrangement 22. Furthermore, the offsetting of duct orifice 28 and device orifice 44 by distance D requires air to turn as it escapes, slowing flow further.

Drain arrangement 22 must be able to pass a minimum size of foreign object debris, while not being so large as to allow too much of the conditioned air in duct 16 to escape when there is no water or foreign object debris to remove. Therefore, in the illustrated embodiment, duct orifice 28 and device orifice 44 have diameters that are between 2.0 mm (0.080 inches) and 3.8 mm (0.150 inches). As shown, duct orifice 28 and device orifice 44 have the same diameter (i.e., 2.0 mm (0.080 inches)), although duct orifice 28 can be larger than device orifice 44. More specifically, the diameter of duct orifice 28 can be up to twice as large as that of device orifice 44, so that the cross-sectional area of duct orifice 28 can be up to four times as large as that of device orifice 44 due to area of a circle being pi times the radius squared. In addition, transition 30 and plenums 32 and 42 are sufficiently large so that an object with a diameter of 2.0 mm (0.080 inches) can pass through drain arrangement 22.

In the illustrated embodiment, distance D is the same size as the diameters of duct orifice 28 and device orifice 44 so there is no straight-line path through duct orifice 28 and device orifice 44. In alternative embodiments, distance D is greater than or less than either the diameter of duct orifice 28 or the diameter of device orifice 44. In the situation where distance D is greater than the diameters of orifices 28 and 44, the escaping air must take a longer path to exit drain arrangement 22, which restricts flow further. In the situation where distance D is smaller than at least one of the diameters of orifices 28 and 44, extension 24 and orifice device can be made smaller in diameter, which saves weight and space. Regardless of the sizes of orifices 28 and 44, distance D can be set so that the edge of device orifice 44 coincides with the side of device plenum 42.

The components and configuration of drain arrangement 22 as shown in FIGS. 2A and 2B allow for liquid water and foreign object debris of a sufficient size to pass through drain arrangement 22 while inhibiting air from flowing through due to the dual orifices in series. In addition, threads 34 and 36 allow orifice device 26 to be removable for cleaning. Furthermore, head plenum 46 allows orifice device 26 to have large faces 38 without incurring the extra weight of a solid head 40.

Figure 3:
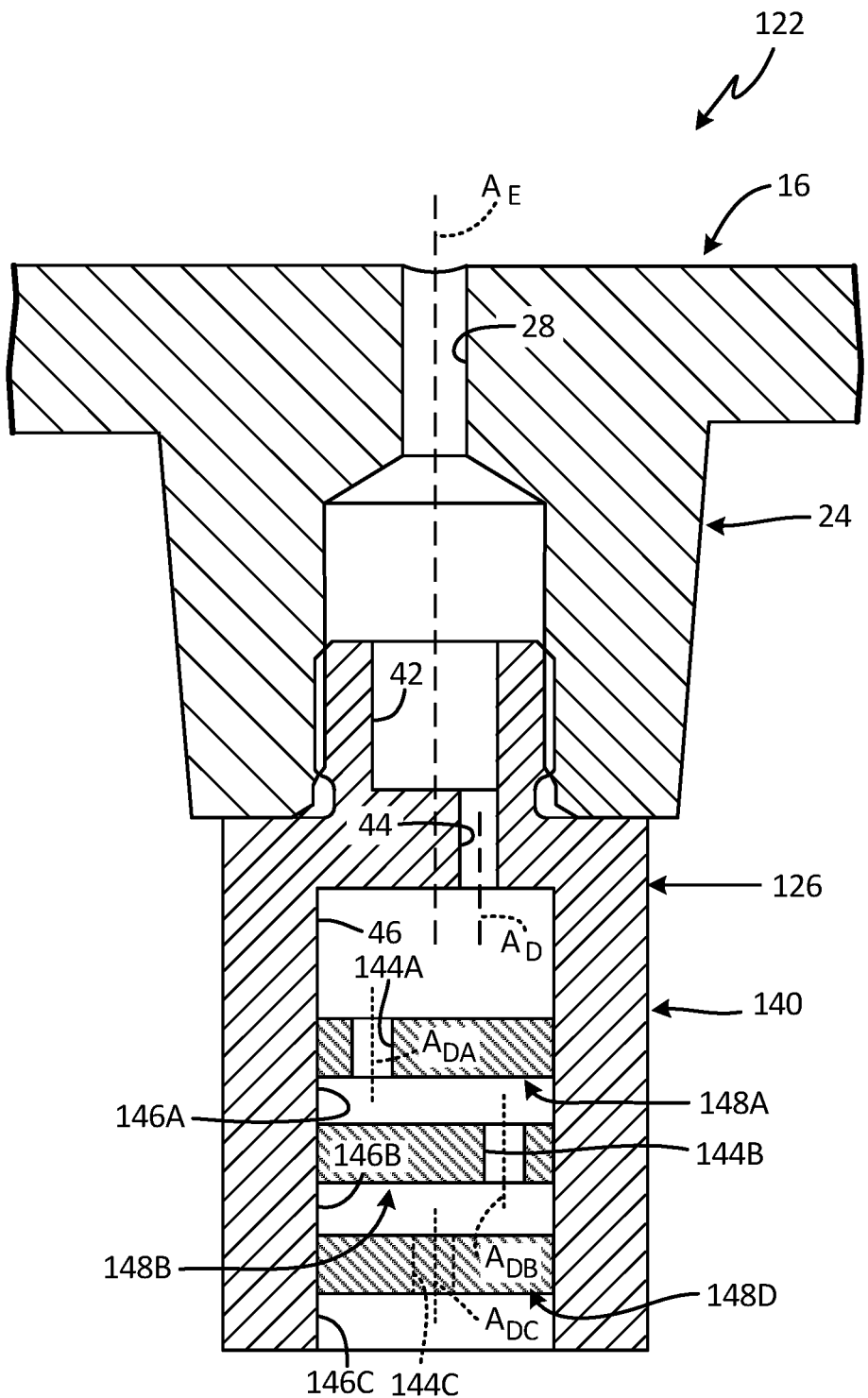
FIG. 3 is a cross-sectional view of an alternate embodiment drain arrangement including an alternate embodiment drain hole orifice device.

FIG. 3 is a cross-sectional view of alternate embodiment drain arrangement 122 including alternate embodiment drain hole orifice device 126. Most of drain arrangement 122 is the substantially the same as drain arrangement 22 (shown in FIGS. 2A and 2B), although head 140 of orifice device 126 is substantially different. More specifically, head 140 includes baffles 148A-148C which are spaced apart from each other. Thereby, in addition to device orifice 44 and head plenum 46, orifice device 126 includes device orifices 144A-144C in baffles 148A-148C interspersed with head plenums 146A-146C, respectively, which are all in serial fluid communication. Furthermore, each device orifice 144A-144C extends along the respective device axis $A_{DA}$-$A_{DC}$ which are parallel to but spaced apart from device axis $A_D$ of device orifice 44 and extension axis $A_E$ of duct orifice 28. Thereby, drain arrangement 122 has five restrictions in series, including device orifice 44, device orifice 144A, device orifice 144B, device orifice 144C, and device orifice 144D, all of which allow liquid water and foreign object debris to pass while inhibiting air flow through drain arrangement 122.

Discussion of Possible Embodiments

The following are non-exclusive descriptions of possible embodiments of the present invention.

An environmental control system according to an exemplary embodiment of this disclosure, among other possible things includes: a first environmental control system component; a second environmental control system component; a duct extending between the first environmental control system component and the second environmental control system component; and a drain in the duct, the drain comprising: a first orifice through the duct; a first plenum in serial fluid communication with the first orifice; and an orifice device removably connected to the duct, the orifice device including a second orifice in serial fluid communication with the plenum and the first orifice.

The environmental control system of the preceding paragraph can optionally include, additionally and/or alternatively, any one or more of the following features, configurations and/or additional components:

A further embodiment of the foregoing environmental control system, wherein each of the first and second environmental control system components can be selected from one of the following list: a heat exchanger, a water collector, a turbine, a compressor, and a valve.

A further embodiment of any of the foregoing environmental control systems, wherein the duct can include a low region at a lowest elevation along a length of the duct, and wherein the drain can be positioned in the low region.

A further embodiment of any of the foregoing environmental control systems, wherein an aircraft can comprise: the environmental control system of claim 1.

A further embodiment of any of the foregoing environmental control systems, wherein the environmental control system can further comprise: an extension of the duct at least partially surrounding the first orifice, wherein the orifice device is removably connected to the extension.

A further embodiment of any of the foregoing environmental control systems, wherein the orifice device can further comprise: a second plenum in serial fluid communication with the second orifice; and a third orifice in serial fluid communication with the second plenum.

A further embodiment of any of the foregoing environmental control systems, wherein the third orifice can be positioned in a baffle that is connected to the orifice device.

A drain arrangement according to an exemplary embodiment of this disclosure, among other possible things includes: a duct with an interior and an exterior; a first orifice through the duct; an extension extending from the exterior of the duct proximate to the first orifice, the extension comprising a first plenum in fluid communication with the first orifice; and an orifice device removably connected to the extension, the orifice device comprising a second orifice in serial fluid communication with the plenum and the first orifice.

The drain arrangement of the preceding paragraph can optionally include, additionally and/or alternatively, any one or more of the following features, configurations and/or additional components:

A further embodiment of the foregoing drain arrangement, wherein the first orifice can have a first cross-sectional area, the second orifice can have a second cross-sectional area, and the plenum can have a third cross-sectional area that is larger than the first and second cross-sectional areas.

A further embodiment of any of the foregoing drain arrangements, wherein the first cross-sectional area can be larger than the second cross-sectional area.

A further embodiment of any of the foregoing drain arrangements, wherein the second cross-sectional area can be no more than four times larger than the first cross-sectional area.

A further embodiment of any of the foregoing drain arrangements, wherein the first orifice and the second orifice can have circular cross-sections each with a diameter between 2.0 mm (0.080 inches) and 3.8 mm (0.150 inches).

A further embodiment of any of the foregoing drain arrangements, wherein the first orifice can extend along a first axis and the second orifice can extend along a second axis that is parallel to the first axis and offset from the first axis by a distance.

A further embodiment of any of the foregoing drain arrangements, wherein the distance can be greater than a first diameter of the first orifice and a second diameter of the second orifice.

A further embodiment of any of the foregoing drain arrangements, wherein the distance can be smaller than a first diameter of the first orifice and a second diameter of the second orifice.

A further embodiment of any of the foregoing drain arrangements, wherein the orifice device can further comprise: a second plenum in serial fluid communication with the first plenum and the second orifice.

A further embodiment of any of the foregoing drain arrangements, wherein the orifice device can further comprise: a third plenum in serial fluid communication with the second orifice.

A further embodiment of any of the foregoing drain arrangements, wherein the orifice device can further comprise: a third orifice in serial fluid communication with the third plenum, wherein the third orifice is positioned in a baffle that is connected to the orifice device.

A further embodiment of any of the foregoing drain arrangements, wherein the extension can be a cylindrical boss surrounding the first orifice.

A further embodiment of any of the foregoing drain arrangements, wherein the extension can include internal threads and the orifice device can include external threads for engaging the internal threads of the extension.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An environmental control system comprising:
   a first environmental control system component;
   a second environmental control system component;
   a duct extending between the first environmental control system component and the second environmental control system component, the duct comprising a first longitudinally extending portion having an interior and an exterior; and
   a drain in the duct, the drain comprising:
      a first orifice through the duct, the first orifice being oriented along a first axis perpendicular to and extending away from the first longitudinally extending portion of the duct;
      an extension of the duct integral to and extending from the exterior of the first longitudinally extending portion of the duct proximate to the first orifice, the extension defining a first cylindrical plenum in fluid communication with the first orifice and oriented along the first axis; and
      an orifice device removably connected to the duct, the orifice device comprising:
         a hollow cylindrical threaded region;
         a solid body portion filling a downstream portion of the orifice device at a base of the cylindrical threaded region, save at a second orifice extending through the solid body;
            wherein the second orifice is in serial fluid communication with the first plenum and the first orifice; and
            wherein the second orifice is oriented along a second axis parallel to the first axis and offset from the first axis by a distance; and
         a third plenum in serial communication with the second, wherein an edge of the second orifice coincides with a side of the third plenum.

2. The environmental control system of claim 1, wherein each of the first and second environmental control system components are selected from one of the following list: a heat exchanger, a water collector, a turbine, a compressor, and a valve.

3. The environmental control system of claim 1, wherein the first longitudinally extending portion of the duct is a low region at a lowest elevation along a length of the duct, and wherein the drain is positioned in the low region.

4. An aircraft comprising:
   the environmental control system of claim 1.

5. The environmental control system of claim 1, wherein the third orifice is positioned in a baffle that is connected to the orifice device.

6. A drain arrangement comprising:
   a duct with first longitudinally extending portion having an interior and an exterior;
   a first orifice through the duct, the first orifice being oriented along a first axis perpendicular to and extending away from the first longitudinally extending portion of the duct;
   an extension of the duct integral to and extending from the exterior of the first longitudinally extending portion of the duct proximate to the first orifice, the extension comprising a first cylindrical plenum in fluid communication with the first orifice and oriented along the first axis; and
   an orifice device removably connected to the extension, the orifice device comprising:
      a hollow cylindrical threaded region;
      a solid body portion filling a downstream portion of the orifice device at a base of the cylindrical threaded region, save at a second orifice extending through the solid body;
         wherein the second orifice is in serial fluid communication with the first plenum and the first orifice; and
         wherein the second orifice is oriented along a second axis parallel to the first axis and offset from the first axis by a distance; and
      a third plenum in serial communication with the second orifice, wherein an edge of the second orifice coincides with a side of the third plenum.

7. The drain arrangement of claim 6, wherein the first orifice has a first cross-sectional area, the second orifice has a second cross-sectional area, and the first plenum has a third cross-sectional area that is larger than the first and second cross-sectional areas.

8. The drain arrangement of claim 7, wherein the first cross-sectional area is larger than the second cross-sectional area.

9. The drain arrangement of claim 8, wherein the second cross-sectional area is no more than four times larger than the first cross-sectional area.

10. The drain arrangement of claim 6, wherein the first orifice and the second orifice have circular cross-sections each with a diameter between 2.0 mm (0.080 inches) and 3.8 mm (0.150 inches).

11. The drain arrangement of claim 6, wherein the distance is greater than a first diameter of the first orifice and a second diameter of the second orifice.

12. The drain arrangement of claim 6, wherein the distance is smaller than a first diameter of the first orifice and a second diameter of the second orifice.

13. The drain arrangement of claim 6, wherein the orifice device further comprises:
   a second plenum in serial fluid communication with the first plenum and the second orifice.

14. The drain arrangement of claim 6, wherein the orifice device further comprises:
   a third orifice in serial fluid communication with the third plenum, wherein the third orifice is positioned in a baffle that is connected to the orifice device.

15. The drain arrangement of claim 6, wherein the extension is a cylindrical boss surrounding the first orifice.

16. The drain arrangement of claim 6, wherein the extension includes internal threads for engaging threads of the cylindrical threaded region of the orifice device.

\* \* \* \* \*